US012612115B2

(12) United States Patent
Sasaki et al.

(10) Patent No.: US 12,612,115 B2
(45) Date of Patent: Apr. 28, 2026

(54) FLOOR STRUCTURE FOR VEHICLE

(71) Applicant: Honda Motor Co., Ltd., Tokyo (JP)

(72) Inventors: Takuya Sasaki, Tokyo (JP); Kota Fujisawa, Tokyo (JP); Yuki Muramatsu, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 397 days.

(21) Appl. No.: 18/530,229

(22) Filed: Dec. 6, 2023

(65) Prior Publication Data
US 2024/0246615 A1 Jul. 25, 2024

(30) Foreign Application Priority Data

Jan. 19, 2023 (CN) .......................... 202310055757.X

(51) Int. Cl.
B62D 25/20 (2006.01)
B60N 2/015 (2006.01)
B62D 21/02 (2006.01)
B62D 25/02 (2006.01)
B62D 27/02 (2006.01)

(52) U.S. Cl.
CPC ......... B62D 25/2036 (2013.01); B60N 2/015 (2013.01); B62D 21/02 (2013.01); B62D 25/025 (2013.01); *B62D 27/02* (2013.01)

(58) Field of Classification Search
CPC .. B62D 25/2036; B62D 25/025; B62D 25/20; B62D 25/2009; B62D 27/00; B62D 27/02; B62D 27/023; B60N 2/015

USPC ........... 296/193.02, 193.03, 193.04, 193.05, 296/193.07, 209
See application file for complete search history.

(56) References Cited

U.S. PATENT DOCUMENTS

| | | | | |
|---|---|---|---|---|
| 8,128,154 B2 * | 3/2012 | Egawa | ............... | B62D 25/2036 296/193.07 |
| 9,902,436 B2 * | 2/2018 | Muramatsu | ........ | B62D 25/2036 |
| 2024/0051611 A1 * | 2/2024 | An | ........................... | B60K 1/04 |

FOREIGN PATENT DOCUMENTS

WO          2015008589          1/2015

* cited by examiner

*Primary Examiner* — Roger L Pang
(74) *Attorney, Agent, or Firm* — JCIPRNET

(57) ABSTRACT

A floor structure for a vehicle includes: side sills, extending along a vehicle front-rear direction on outer sides in a vehicle width direction of the vehicle; a floor panel, disposed on inner sides of the side sills in the vehicle width direction, and including a panel section disposed below a cabin and a flange section joined to the side sill; and a floor cross member, disposed at a rear end of the floor panel in the vehicle front-rear direction. The panel section includes: a front panel section; and a rear panel section. The flange section is formed with a joggle section, and a rear end of the joggle section corresponds to the front panel section in the vehicle width direction. The floor cross member is sandwiched and joined by the side sill and the flange section at the joggle section and a first joint section is formed.

8 Claims, 4 Drawing Sheets

FLOOR STRUCTURE FOR VEHICLE

CROSS-REFERENCE TO RELATED APPLICATION

This application claims the priority benefit of China application Ser. No. 202310055757.X, filed on Jan. 19, 2023. The entirety of the above-mentioned patent application is hereby incorporated by reference herein and made a part of this specification.

BACKGROUND

Technical Field

The disclosure relates to a floor structure for a vehicle.

Description of Related Art

In recent years, the importance of improving the safety of transportation systems has increased, taking into account vulnerable groups such as the elderly and children among transportation participants. In order to achieve this goal, efforts have to be made to improve development related to the improvement of vehicle rigidity to further improve transportation safety and convenience. In the related art (Published International Application No. WO2015/008589), in order to adapt to different vehicle body structures, the floor structure for the vehicle needs to be designed as a special structure to match the vehicle body. Therefore, in the absence of versatility, vehicle development and manufacturing costs are increased. The disclosure aims to achieve a floor structure for a vehicle capable of being adapted to a variety of different vehicle bodies, thereby contributing to the development of a sustainable transport system.

SUMMARY

The disclosure provides a floor structure for a vehicle capable of being adapted to a variety of different vehicle bodies.

The floor structure for the vehicle of the disclosure includes: side sills, which extend along a vehicle front-rear direction on outer sides in a vehicle width direction of the vehicle; a floor panel, which is disposed on inner sides of the side sills in the vehicle width direction, and includes a panel section disposed below a cabin and a flange section joined to the side sill; and a floor cross member, which is disposed at a front end of the floor panel in the vehicle front-rear direction. The panel section includes: a front panel section, which is provided with multiple beads extending along the vehicle width direction; and a rear panel section, which is disposed on a rear side of the front panel section in the vehicle front-rear direction. The flange section is formed with a joggle section, and a rear end of the joggle section corresponds to the front panel section in the vehicle width direction. The floor cross member is sandwiched and joined by the side sill and the flange section at the joggle section and a first joint section is formed.

In an embodiment of the disclosure, the side sill includes a front sill section constituting a front side and a rear sill section constituting a rear side. The front sill section and the flange section are joined closer to the front than the first joint section in the vehicle front-rear direction and form a section joint section. The rear sill section, the front sill section and the floor cross member are joined closer to the rear than the first joint section in the vehicle front-rear direction and form a third joint section.

In an embodiment of the disclosure, the third joint section is formed by sandwiching and joining the rear sill section between the front sill section and the floor cross member.

In an embodiment of the disclosure, at least two third joint sections exist, an overlapping section is disposed at an overlapping portion of the rear panel section and the floor cross member and the third joint sections are disposed at a position closer to the rear than the overlapping section in the vehicle front-rear direction.

In an embodiment of the disclosure, a rear end edge of the rear panel section is disposed at a position more rear than the joggle section in the vehicle front-rear direction, and the rear end edge has an inclined section inclined toward the joggle section.

In an embodiment of the disclosure, an outer end section of the floor cross member in the vehicle width direction forms a protruding section protruding forward in the vehicle front-rear direction, the protruding section is sandwiched by the side sill and the floor panel, and a length of the protruding section in the vehicle width direction is greater than a length of the inclined section in the vehicle width direction.

In an embodiment of the disclosure, the flange section includes convex sections, the convex section is formed in a gap between the flange section and the side sill and more front than the joggle section in the vehicle front-rear direction, and a second joint section is provided between the joggle section and the convex section.

In an embodiment of the disclosure, a seat is installed on the floor cross member.

Based on the above, in the floor structure for the vehicle of the disclosure, the flange section is formed with the joggle section, and the rear end of the joggle section is disposed corresponding to the front panel section. Furthermore, the floor cross member is sandwiched and joined at the joggle section and the first joint section is formed. Therefore, the length of the floor panel is adjusted (for example, by cutting) and determined according to the vehicle type, and then the side sill suitable for the floor panel is cut or the matching side sill is selected, so that the floor panel, the side sill and the floor cross member can be joined. Since additionally designing a special joint structure and a joining method is not needed, development and manufacturing costs can be saved. In addition, the floor cross member being sandwiched and joined at the joggle section can improve the joint strength between the floor cross member and the vehicle body. Accordingly, the floor structure for the vehicle of the disclosure is capable of being adapted to a variety of different vehicle bodies.

DESCRIPTION OF THE EMBODIMENTS

Figure 1:
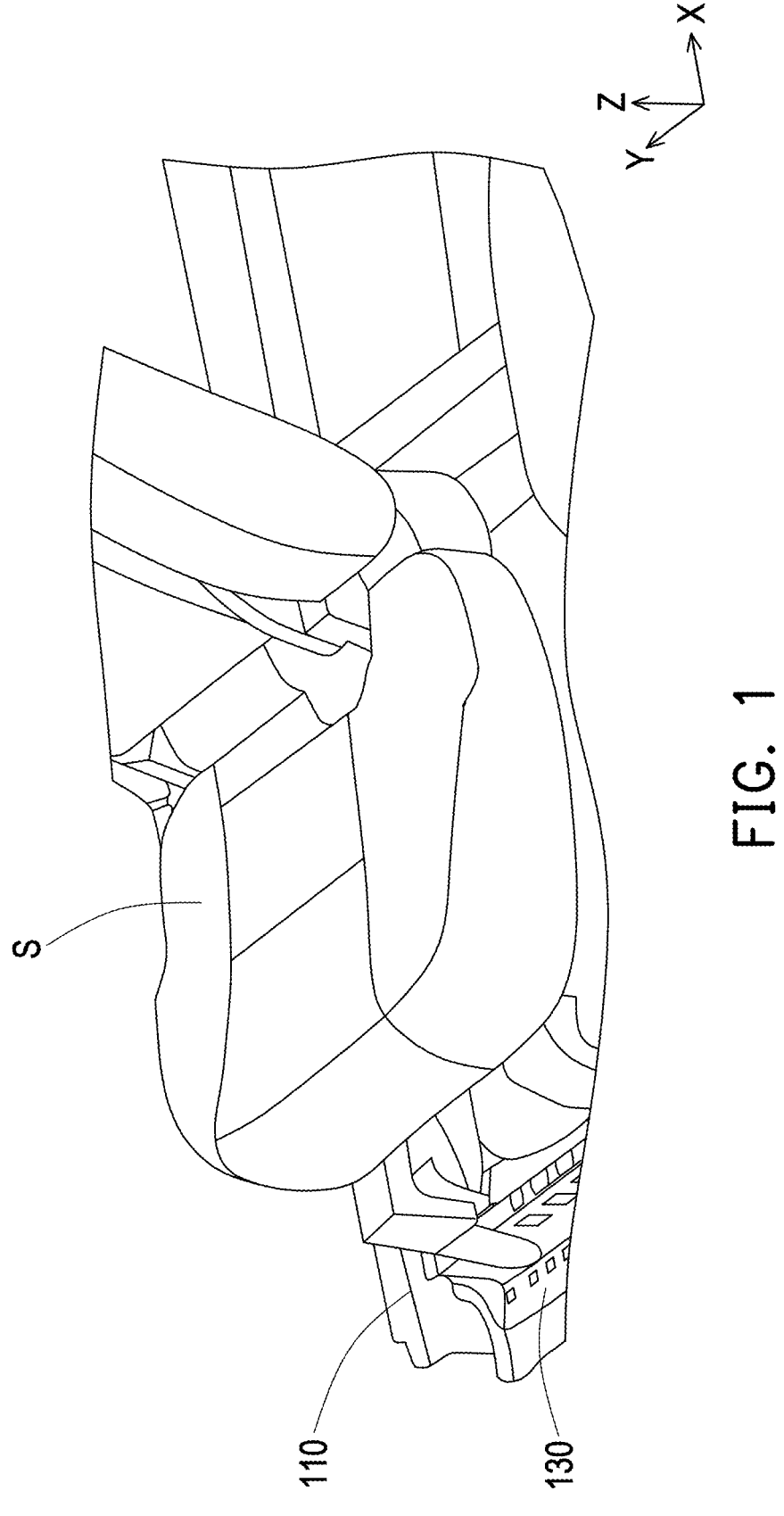
FIG. 1 is a schematic three-dimensional view of a floor structure for a vehicle disposed in a vehicle according to an embodiment of the disclosure.
Figure 2:
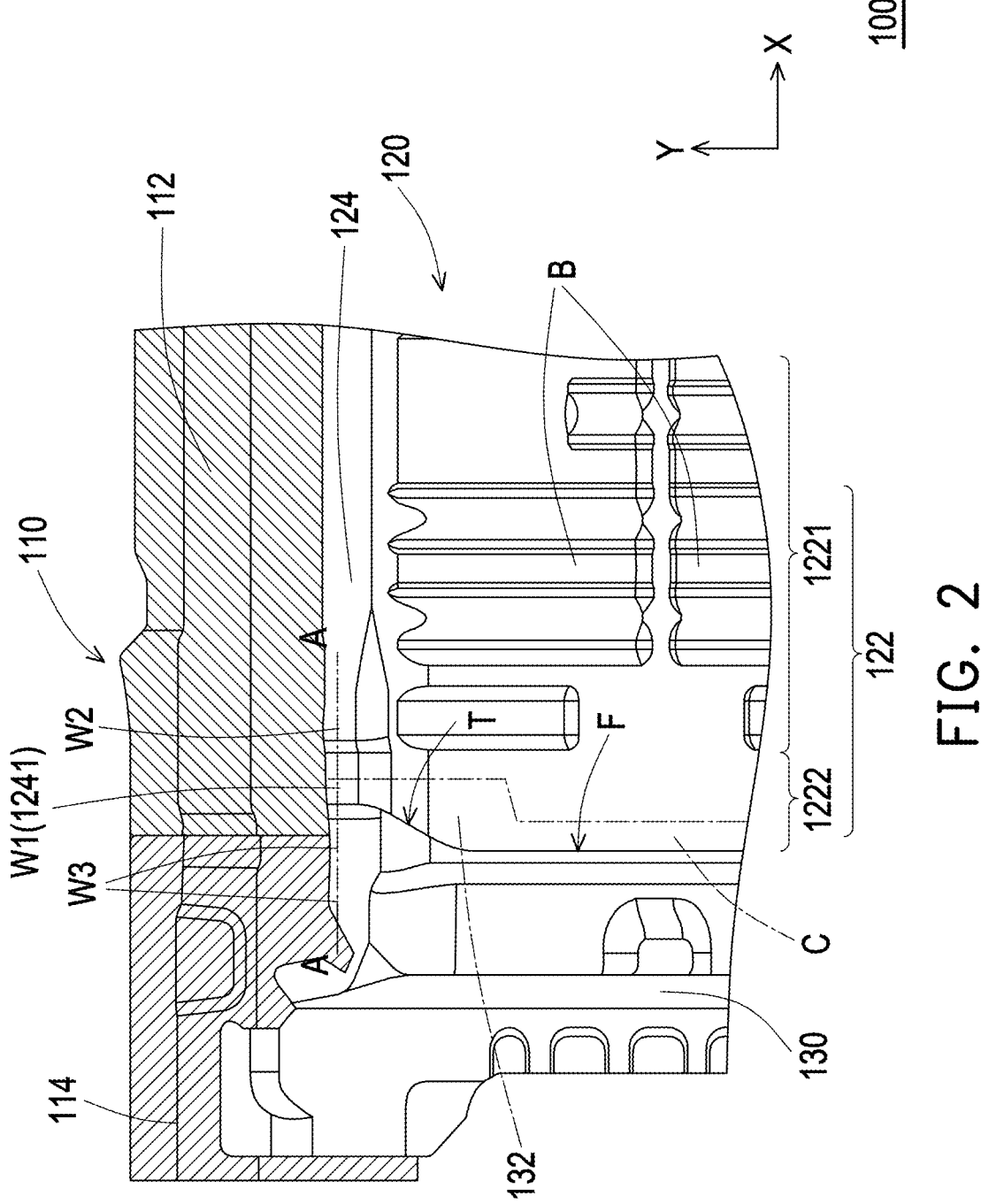
FIG. 2 is a partial top view of the floor structure for the vehicle of FIG. 1.
Figure 3:
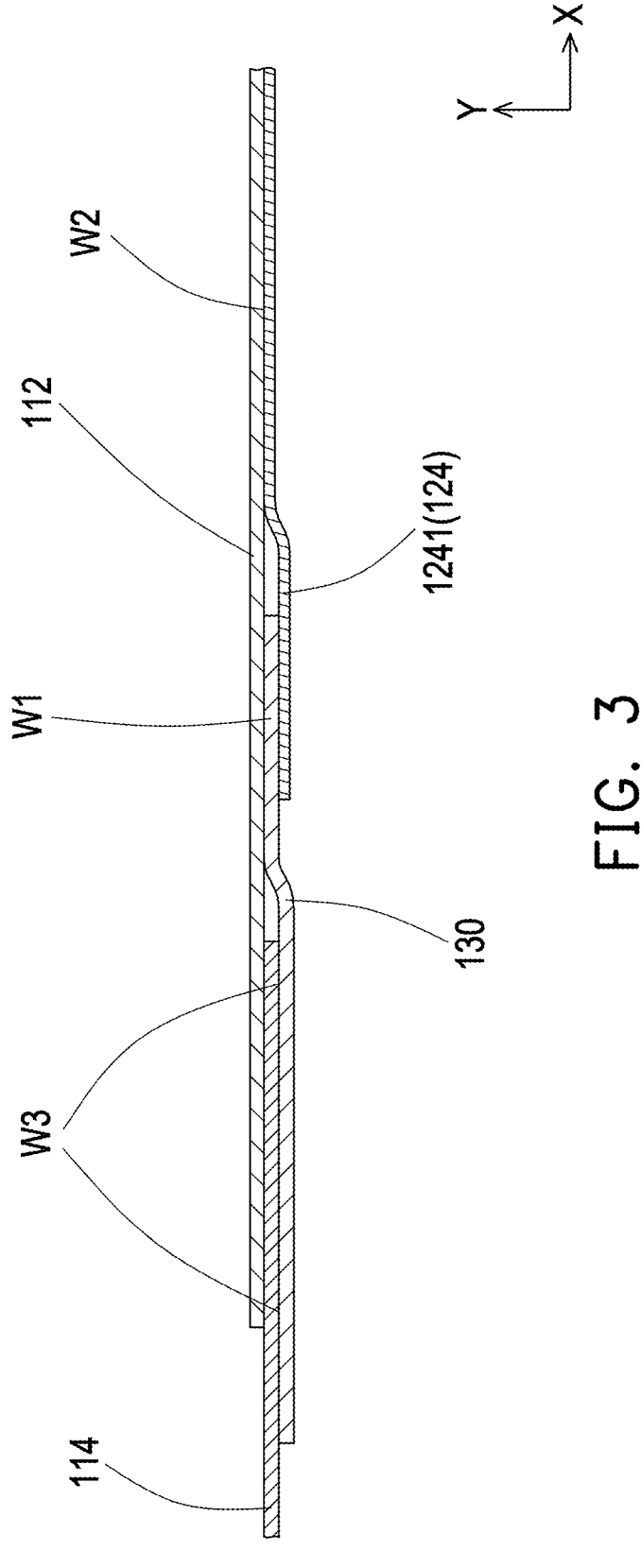
FIG. 3 is a top cross-sectional view of the floor structure for the vehicle of FIG. 2 along an A-A section line.

FIG. 1 is a schematic three-dimensional view of a floor structure for a vehicle disposed in a vehicle according to an embodiment of the disclosure. FIG. 2 is a partial top view of the floor structure for the vehicle of FIG. 1. FIG. 3 is a top cross-sectional view of the floor structure for the vehicle of FIG. 2 along an A-A section line. As shown in FIG. 1, in the embodiment, a floor structure for a vehicle 100 is, for example, a floor structure applied in an ordinary passenger car (not shown), that is, below a cabin, and a seat S is installed on a floor cross member 130 described later, but the disclosure is not limited thereto. Since the floor structure for the vehicle 100 is a substantially symmetrical structure, the drawings merely show partial schematic diagrams to simplify the description. Moreover, a vehicle front-rear direction X, a vehicle width direction Y and a vehicle up-down direction Z in the drawings are not intended to limit the positional relationship of each of components of the disclosure. In addition, it should be noted that unless otherwise stated, the front, outer side and above used in the following description are the directions pointed by arrows of the vehicle front-rear direction X, the vehicle width direction Y and the vehicle up-down direction Z, and the rear, inner side and below used in the description are the opposite directions of the aforementioned. Reference is now made in detail to exemplary embodiments of the disclosure, and examples of the exemplary embodiments are illustrated in the accompanying drawings. Wherever possible, the same reference numerals are used in the accompanying drawings and descriptions to refer to the same or similar parts.

Referring to FIG. 2, in the embodiment, the floor structure for the vehicle 100 includes side sills 110, a floor panel 120 and a floor cross member 130. The side sills 110 extend along the vehicle front-rear direction X at opposite outer sides in the vehicle width direction Y (merely one side is illustrated in the drawing). The floor panel 120 is disposed between the side sills 110 on opposite sides, that is, on the inner sides of the side sills 110 in the vehicle width direction Y. The floor panel 120 includes a panel section 122 disposed below a cabin, and a flange section 124 joined to the side sill 110. The floor cross member 130 is disposed at a rear end of the floor panel 120 in the vehicle front-rear direction Y. In other words, the floor panel 120 is disposed surrounded by the side sills 110 and the floor cross member 130. The panel section 122 includes a front panel section 1221 and a rear panel section 1222. The front panel section 1221 is provided with multiple beads B extending in the vehicle width direction Y. The rear panel section 1222 is disposed on a rear side of the front panel section 1221 in the vehicle front-rear direction X, and is formed into a relatively flat surface relative to the front panel section 1221.

Referring to FIG. 3, in the embodiment, the flange section 124 is formed with a joggle section 1241, so that a gap is formed between the side sill 110 and the flange section 124 in the vehicle width direction Y. A rear end of the joggle section 1241 corresponds to the front panel section 1221 in the vehicle width direction Y. The floor cross member 130 is sandwiched and joined by the side sill 110 and the flange section 124 at the joggle section 1241 and a first joint section W1 is formed. That is, a part of the floor cross member 130 extends along the vehicle front-rear direction X to the gap between the side sill 110 and the flange section 124 to be sandwiched and joined.

It can be seen from this that in the floor structure for the vehicle 100 of the embodiment, the flange section 124 is formed with the joggle section 1241, and the rear end of the joggle section 1241 is disposed corresponding to the front panel section 1221. Furthermore, the floor cross member 130 is sandwiched and joined at the joggle section 1241 and the first joint section W1 is formed. Therefore, the length of the floor panel 120 is adjusted (for example, by cutting) and determined according to the vehicle type, and then the side sill 110 suitable for the floor panel 120 is cut or the matching side sill 110 is selected, so that the floor panel 120, the side sill 110 and the floor cross member 130 can be joined. Since additionally designing a special joint structure and a joining method is not needed, development and manufacturing costs can be saved. In addition, the floor cross member 130 being sandwiched and joined at the joggle section 1241 can improve the joint strength between the floor cross member 130 and the vehicle body. Accordingly, the floor structure for the vehicle 100 of the embodiment is capable of being adapted to a variety of different vehicle bodies.

In addition, in the embodiment, as shown in FIGS. 2 and 3, the side sill 110 includes a front sill section 112 constituting a front side, and a rear sill section 114 constituting a rear side. The front sill section 112 extends along the vehicle front-rear direction X to the outer side of the rear sill section 114 in the vehicle width direction Y, so that a part of the front sill section 112 and the rear sill section 114 are disposed to overlap each other. The front sill section 112 and the flange section 124 are joined closer to the front than the first joint section W1 in the vehicle front-rear direction X and form a second joint section W2. The rear sill section 114, the front sill section 112 and the floor cross member 130 are joined closer to the rear than the first joint section W1 in the vehicle front-rear direction X and form third joint sections W3. In this way, even if the length of the rear panel section 1222 is changed, the joint strength between the front sill section 112 and the floor panel 120 (front section), and the joint strength between the rear sill section 114 and the floor cross member 130 (rear section) can be ensured.

Furthermore, in the embodiment, as shown in FIG. 3, the third joint section W3 is formed by sandwiching and joining the rear sill section 114 between the front sill section 112 and the floor cross member 130. Specifically, the floor cross member 130 is formed with a joggle section so that a gap is formed between the floor cross member 130 and the front sill section 112 in the vehicle width direction Y. The rear sill section 114 is disposed in the gap and is sandwiched and joined by the floor cross member 130 and the front sill section 112. Thus, the front sill section 112 and the floor panel 120 are easier to assemble with the rear sill section 114 and the floor cross member 130, thereby improving assemblability. Furthermore, as shown in FIG. 2, at least two third joint sections W3 exist. The floor cross member 130 extends below the rear panel section 1222, and an overlapping section C is disposed at the overlapping portion of the rear panel section 1222 and the floor cross member 130. The third joint section W3 is disposed at a position closer to the rear than the overlapping section C in the vehicle front-rear direction X. Accordingly, the load can be transmitted through the joint sections (the first joint section W1 and the third joint section W3) of the side sill 110, the floor panel 120 and the floor cross member 130 with relatively high rigidity to disperse the load of the joint section (overlapping section C) of the rear panel section 1222 and the floor cross member. 130.

In addition, in the embodiment, a rear end edge F of the rear panel section 1221 is disposed at a position more rear than the joggle section 1241 in the vehicle front-rear direction X, and the rear end edge F has an inclined section T inclined toward the joggle section 1241. Specifically, the inclined section T extends obliquely toward the outer side in the vehicle width direction Y and the front in the vehicle front-rear direction X. An outer end section of the floor cross member 130 in the vehicle width direction Y forms a protruding section 132 protruding forward in the vehicle front-rear direction X, and the protruding section 132 extends to a place further front than the inclined section T. The protruding section 132 is sandwiched and joined by the side sill 110 and the floor panel 120, and the length of the protruding section 132 in the vehicle width direction Y is greater than the length of the inclined section T in the vehicle width direction Y. Such a disposition method may ensure that the rear section and the front section can be easily assembled regardless of the length of the vehicle body. In addition, the joint section of the floor cross member 130 and the side sill 110 can be disposed to be offset in the vehicle front-rear direction X relative to the joint section of the floor panel 120 and the floor cross member 130 to ensure sufficient joint strength and improve overall rigidity.

Figure 4:
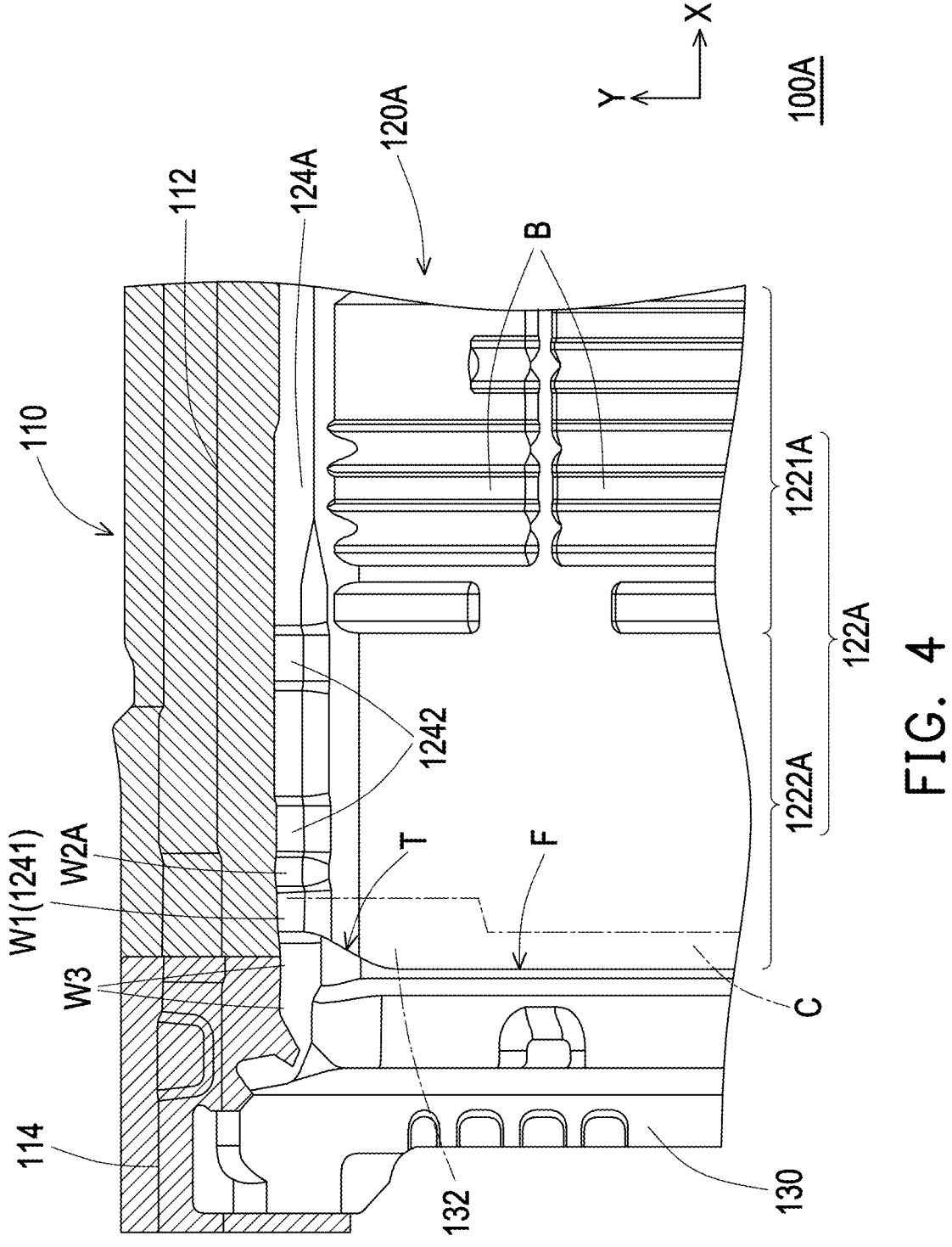
FIG. 4 is a partial top view of a floor structure for a vehicle according to another embodiment of the disclosure.

FIG. 4 is a partial top view of a floor structure for a vehicle according to another embodiment of the disclosure. The main difference between the embodiment and the embodiment of FIG. 2 lies in the structure of a floor panel 120A. Referring to FIG. 4, in the embodiment, the length of a rear panel section 1222A of a panel section 122A in the vehicle front-rear direction X is substantially equal to the length of a front panel section 1221A in the vehicle front-rear direction X. A flange section 124A includes convex sections 1242 formed in a gap (not shown) between the flange section 124A and the side sill 110 and more front than the joggle section 1241 in the vehicle front-rear direction X. A second joint section W2A is disposed between the joggle section 1241 and the convex section 1242. In this way, even if corresponding to a vehicle body with a relatively long length of the panel section 120A, the joint strength of the floor panel 120A and the side sill 110 can still be maintained.

In summary, in the floor structure for the vehicle of the disclosure, the flange section is formed with the joggle section, and the rear end of the joggle section is disposed corresponding to the front panel section. Moreover, the floor cross member is sandwiched and joined at the joggle section and the first joint section is formed. Therefore, merely adjusting the length of the side sill and the length of the panel section to correspond to different vehicle bodies (for example, adjusting the length of the side sill and the length of the panel section by cutting) is needed without designing special joint structures for different lengths. In addition, the floor cross member being sandwiched and joined at the joggle section can improve the joint strength of the floor cross member and the rear section of the vehicle body. In an exemplary example, the side sill and the flange section are joined closer to the front than the first joint section in the vehicle front-rear direction and form the second joint section; and the side sill and the floor cross member are joined closer to the rear than the first joint section in the vehicle front-rear direction and form the third joint section. In this way, even if the length of the panel section is changed, the joint strength of the side sill and the floor panel and the joint strength of the side sill and the floor cross member can still be ensured. Accordingly, the floor structure for the vehicle of the disclosure is capable of being adapted to a variety of different vehicle bodies.

Finally, it should be noted that the above embodiments are merely used to illustrate the technical solutions of the disclosure, but not to limit the technical solutions of the disclosure. Although the disclosure has been described in detail with reference to the foregoing embodiments, those of ordinary skill in the art should understand that the technical solutions described in the foregoing embodiments may still be modified, or some or all of the technical features thereof may be equivalently replaced. However, these modifications or substitutions do not make the essence of the corresponding technical solutions deviate from the scope of the technical solutions of the embodiments of the disclosure.

What is claimed is:

1. A floor structure for a vehicle, comprising:
side sills, extending along a vehicle front-rear direction on outer sides in a vehicle width direction;
a floor panel, disposed on inner sides of the side sills in the vehicle width direction, and the floor panel comprising a panel section disposed below a cabin and a flange section joined to the side sill; and
a floor cross member, disposed at a rear end of the floor panel in the vehicle front-rear direction, wherein
the panel section comprises:
a front panel section, provided with a plurality of beads extending along the vehicle width direction, and
a rear panel section, disposed on a rear side of the front panel section in the vehicle front-rear direction,
the flange section is formed with a joggle section, and a rear end of the joggle section corresponds to the front panel section in the vehicle width direction, and
the floor cross member is sandwiched and joined by the side sill and the flange section at the joggle section and a first joint section is formed.

2. The floor structure for the vehicle according to claim 1, wherein
the side sill comprises a front sill section constituting a front side, and a rear sill section constituting a rear side,
the front sill section and the flange section are joined closer to the front than the first joint section in the vehicle front-rear direction and form a second joint section, and
the rear sill section, the front sill section and the floor cross member are joined closer to the rear than the first joint section in the vehicle front-rear direction and form a third joint section.

3. The floor structure for the vehicle according to claim 2, wherein
the third joint section is formed by sandwiching and joining the rear sill section between the front sill section and the floor cross member.

4. The floor structure for the vehicle according to claim 2, wherein
at least two third joint sections exist,
an overlapping section is disposed at an overlapping portion of the rear panel section and the floor cross member, and
the third joint sections are disposed at a position closer to the rear than the overlapping portion in the vehicle front-rear direction.

5. The floor structure for the vehicle according to claim 1, wherein
a rear end edge of the rear panel is disposed at a position more rear than the joggle section in the vehicle front-rear direction, and
the rear end edge has an inclined section inclined toward the joggle section.

6. The floor structure for the vehicle according to claim 5, wherein
an outer end section of the floor cross member in the vehicle width direction forms a protruding section protruding forward in the vehicle front-rear direction, the protruding section is sandwiched by the side sill and the floor panel, and
a length of the protruding section in the vehicle width direction is greater than a length of the inclined section in the vehicle width direction.

7. The floor structure for the vehicle according to claim 1, wherein the flange section comprises convex sections, the convex sections are formed in a gap between the flange section and the side sill and more front than the joggle section in the vehicle front-rear direction, and a second joint section is disposed between the joggle section and the convex section.

8. The floor structure for the vehicle according to claim 1, wherein a seat is installed on the floor cross member.

\* \* \* \* \*